United States Patent [19]

Timken

[11] Patent Number: 5,430,000
[45] Date of Patent: Jul. 4, 1995

[54] METHOD FOR PREPARING TITANIA-BOUND ZEOLITE CATALYSTS

[75] Inventor: Hye K. C. Timken, Woodbury, N.J.

[73] Assignee: Mobil Oil Corporation, Fairfax, Va.

[21] Appl. No.: 112,501

[22] Filed: Aug. 25, 1993

[51] Int. Cl.⁶ ............................................. B01J 29/40
[52] U.S. Cl. ............................... 502/60; 502/64; 502/69; 502/71
[58] Field of Search ................. 502/60, 64, 66, 69, 502/71

[56] References Cited

U.S. PATENT DOCUMENTS

| | | | |
|---|---|---|---|
| 3,702,886 | 11/1972 | Argauer et al. | 423/328 |
| 3,843,741 | 10/1974 | Yan | 260/673.5 |
| 4,013,732 | 3/1977 | Chang et al. | 260/668 R |
| 4,582,815 | 4/1986 | Bowes | 502/64 |
| 4,957,891 | 9/1990 | Sachtler et al. | 502/71 |
| 4,961,917 | 10/1990 | Byrne | 423/239 |
| 4,973,399 | 11/1990 | Green et al. | 208/120 |
| 5,053,374 | 10/1991 | Absil et al. | 502/64 |
| 5,143,879 | 9/1992 | Whitehurst | 502/85 |
| 5,147,837 | 9/1992 | Dessau et al. | 502/66 |
| 5,182,242 | 1/1993 | Marler | 502/66 |

FOREIGN PATENT DOCUMENTS 0889611 12/1981 U.S.S.R. .............................. 502/60

Primary Examiner—Gary P. Straub
Assistant Examiner—Thomas G. Dunn, Jr.
Attorney, Agent, or Firm—Alexander J. McKillop; Dennis P. Santini; Lori F. Cuomo

[57] ABSTRACT

Low acidity titania-bound molecular sieve, e.g., zeolite compositions, for example, titania-bound zeolite Beta and titania-bound ZSM-5, possessing superior physical properties, e.g., crush strength are described. Since low acidity titanium oxide-bound catalysts exhibit lower binder activity than alumina-bound zeolite catalysts, the former are particularly useful in hydrocarbon conversion processes in which reduced coke make increases catalyst cycle length. Due to their stability in acid environments, the low acidity titania oxide-bound molecular sieve extrudate herein can be acid treated without unduly compromising its structural integrity.

18 Claims, No Drawings

METHOD FOR PREPARING TITANIA-BOUND ZEOLITE CATALYSTS

CROSS-REFERENCE TO RELATED APPLICATIONS

This application is related in scope of subject matter to U.S. application Ser. No. 08/112,396, filed on even date herewith.

BACKGROUND

The invention relates to a method for preparing mechanically stable molecular sieve catalyst compositions possessing a titania binder of low acidity.

The catalysts of the invention possess significant physical strength and will resist abrasion and fracture during loading and transit. These catalysts easily withstand loads in a catalyst bed due to fluid pressure drop and weight of superimposed catalyst. They also have superior interior cohesion allowing for calcination and regeneration without catalyst particle breakup.

Molecular sieves for use as catalyst components herein include zeolites, aluminophosphates, silicoaluminophosphates, layered and pillared-layered materials and other catalytically active crystalline materials.

The term "zeolite" as used herein designates the class of porous crystalline silicates, which contain silicon and oxygen atoms as major components. Other framework components can be present in usually less than about 14 mole%, and often less than about 4%. These components include aluminum, gallium, iron, boron, etc., and combinations thereof. The crystalline aluminosilicates constitute an especially well known type of zeolite.

It is well known that extrusion is one way of obtaining a molecular sieve-containing material which has a high degree of strength for various applications, both catalytic and noncatalytic. Some molecular sieves, e.g., aluminosilicate zeolites, have long been used as catalysts for a wide variety of organic conversion processes. In general, the molecular sieve is incorporated with a matrix, or binder material in order to impart mechanical stability hereto. The most commonly used matrix materials have included alumina and/or clays since these materials are fairly easy to extrude and provide extrudates of good physical strength for many applications.

It has come to be recognized that low acidity refractory oxides, such as titania, zirconia and silica, are desirable matrix materials and that they possess advantages over alumina for some catalytic reactions. In this connection, U.S. Pat. No. 4,013,732 specifically discloses ZSM-5 with a silica matrix and U.S. Pat. Nos. 3,843,741 and 3,702,886 broadly disclose the use of ZSM-5 with a silica matrix.

U.S. Pat. No. 4,582,815 describes a method for preparing silica-rich solids said to possess improved crush strength compared to that of known silica-bound materials. The method comprises mixing silica-rich solids, preferably a mixture of silica with a zeolite such as ZSM-4 (Omega), ZSM-5, ZSM-11, ZSM-12, ZSM-23, ZSM-35, ZSM-48, Beta, X, Y, L, ferrierite, mordenite, dachiardite, clinoptilolite, offretite, erionite, gmelinite, chabazite, etc., with water and an alkali metal base such as sodium hydroxide or a basic salt such as an alkali-metal carbonate, borate, phosphate, silicate, etc., as an extrusion aid followed by mulling, extruding and subsequently drying the extrudate. It is thought that substitution of alkali metal for hydrogen in the silanol groups on the surfaces of siliceous materials such as the foregoing zeolites is responsible for their improved crush strength. The resulting extrudate is said to possess superior crush strength and sufficient integrity to withstand treatments with acids so that is possible to steam, acid extract or calcine them. To avoid trapping the alkali metal of the extrusion aid in the extrudate, the alkali metal is ordinarily removed by exchange under acidic conditions using dilute nitric acid in 1M ammonium nitrate solution.

Silica-bound zeolite catalysts prepared in accordance with the method described in U.S. Pat. No. 4,582,815 are indicated to be useful in hydrocarbon conversions such as hydrocracking, isomerization, hydrogenation, dehydrogenation, polymerization, reforming, catalytic cracking and catalytic hydrocracking.

U.S. Pat. No. 5,053,374 teaches another method for preparing zeolite catalysts bound with low acidity refractory oxide, e.g., silica. The method involves providing a substantially homogeneous mixture of zeolite, water and low acidity binder at least partly in colloidal form. The mixture is free of added alkali metal base and/or basic salt. The mixture is extruded, dried and calcined to provide the catalyst.

Another method for the binding of zeolites with zirconia to produce catalysts with commercially acceptable physical strength is shown in U.S. Pat. No. 5,182,242 which teaches the use of polymeric, hydroxy or alkoxy-bridged zirconia solutions, such as ammonium zirconium carbonate in conjunction with zirconium oxide.

SUMMARY OF THE INVENTION

It has now been discovered that a low acidity titania-bound molecular sieve possessing superior mechanical stability and low binder acidity making it especially useful as a catalyst for certain kinds of organic compound conversions can be prepared by the method which comprises:

(a) providing a substantially homogenous mixture of molecular sieve material, a low acidity titania binder material and an aqueous slurry of titanium oxide hydrate to provide a formable, e.g., extrudable, mass;

(b) forming, e.g., extruding, the formable, e.g, extrudable, mass resulting from step (a); and (c) calcining the formed product, e.g., extrudate, resulting from step (b).

Prior to the calcination step (c), the product of step (b) may be dried at a temperature of, e.g., at least 65° C., e.g., from 65° C. to about 260° C., for a time sufficient to dry the step (b) product, e.g., from about 5 minutes, such as when a belt dryer is used, to at least about 1 hour. Calcining step (c) may take place in air, or inert gas, at temperatures ranging, e.g., from about 260° C. to about 815° C. for periods of time ranging, e.g., from about 1 to about 48 hours or more.

The calcined product, e.g., extrudate, can be subjected to other operations such as base exchange, dealumination, steaming, impregnating with catalytically active metal(s), the details of which are well known in the art.

EMBODIMENTS

Although the forming step (b) may involve tableting or pelleting, extrusion is preferred. The extrusion process used herein preferably involves the use of a screw extruder. Such screw extruders are also known as auger extruders or auger-type extruders. Screw extruders are distinguishable from extrusion presses, which are also useful for the present method. In an extrusion press or ram extruder, a mass of extrudable material is forced through a die by means of a plunger or piston which may be mechanically or hydraulically operated.

By virtue of the design of an extrusion press, very large compaction forces may be generated therein. Therefore, it is possible to form an extrudate from masses which would not be extrudable under lower compacting forces by using the large compaction forces of an extrusion press. However, another inherent feature of an extrusion press results in the disadvantage that extrusions cannot be conducted in a continuous fashion. Extrudable masses can only be passed through the die one batch at a time, the piston or plunger being withdrawn from the die between batches.

Unlike extrusion presses, the preferred screw extruders can be operated in a continuous fashion. In a screw extruder, a feed is transported from a feed point to the die by means of a turning screw or auger. The feed is either introduced as an extrudable mass or is converted into an extrudable mass within the extruder with the aid of mixing action imparted by the screw. An example of a screw extruder is a 2" (5 cm) Bonnot extruder. Unlike extrusion in extrusion presses, however, high pressures cannot be generated in screw extruders. Therefore, although extrudate may be formed at a faster rate in screw extruders, by virtue of continuous operation, such screw extruders are more limited than extrusion presses insofar as feeds which may be employed therein. More particularly, masses which are only extrudable under high compaction forces are not extrudable in screw extruders. A surprising feature of the present process was the discovery of a means for forming extrudates with low acidity refractory oxide binders, such as titania, zirconia and/or silica, especially without using high compaction forces beyond the limits achievable by screw extruders.

Unlike alumina binders, low acidity refractory oxide binders such as titania do not interact with molecular sieves such as, for example, zeolites, to increase the acid catalytic activity thereof. Consequently, molecular sieves can be bound with low acidity titania in accordance with the method of this invention without increasing the molecular sieves' intrinsic activity as might occur with an alumina binder. This is particularly important for low acidity zeolites having a silica to alumina molar ratio of 100 or more where the low acidity needs to be maintained throughout the catalyst preparation procedures.

In some types of hydrocarbon conversions, e.g., hydroprocessing, reforming, catalytic cracking and hydrocracking, and conversion of olefins to alcohols and/or ethers, the use of low-acidity refractory oxide-bound molecular sieves, such as, for example, titania-bound zeolites, having lower levels of binder activity than their alumina-bound counterparts can result in lower coke production and significant increases in cycle length.

Since the low acidity titania-bound molecular sieve catalysts of the present invention are capable of maintaining their structural integrity in low pH solutions very well, the molecular sieve dispersed in such a binder can be treated with an acid solution to effect dealumination. This effectively results in a reduction in manufacturing costs of low acidity catalysts since extrudates are easier to handle than powders.

The present method requires the presence of an aqueous slurry of hydrous titania in the extrudable mass of step (a). The term aqueous slurry of titanium oxide hydrate is used interchangeably with the term aqueous slurry of hydrous titania. The product catalyst of this method has superior properties to products of other catalyst preparation methods, such as compared to products from methods involving colloidal metal oxides, metallopolymers and/or added alkali metal base or basic salt.

The method for preparing a low acidity titania-bound molecular sieve of this invention is not limited to any particular molecular sieve material and in general includes all metallosilicates, metallophosphates, silicoaluminophosphates, and layered and pillared layered materials, particularly the aluminosilicates whether or not previously dealuminized to increase the framework silica:alumina ratio. Typical zeolites include ZSM-4 (Omega), ZSM-5, ZSM-11, ZSM-12, ZSM-20, ZSM-22, ZSM-23, ZSM-35, ZSM-48, ZSM-50, MCM-22, PSH-3, MCM-49, Beta, X, Y, and L, as well as ferrierite, mordenite, dachiardite, clinoptilolite, offretite, erionite, gmelinite, chabazite, etc. Other molecular sieves contemplated include, for example, MCM-9, VPI-5, MCM-20, SAPO-11, SAPO-17, SAPO-34, SAPO-37, MCM-36, and MCM-41.

It is to be understood that the identification of the molecular sieves, e.g., zeolites, be resolved on the basis of their respective X-ray diffraction patterns. The present invention contemplates utilization of such molecular sieves wherein the mole ratio of silica-to-metal oxide is essentially unbounded. The molecular sieves are not limited to specific silica:metal oxide mole ratios, since they may be substantially metal-free and, yet, having the same crystal structure as the disclosed materials, may be useful or even preferred in some applications. It is the crystal structure, as identified by the X-ray diffraction "fingerprint", which established the identity of the specific molecular sieve, e.g., zeolite, material.

The titania binder material herein can be combined with other refractory oxides of metals of Groups IIIA, IVA and IVB of the Periodic Table of the Elements. Particularly useful are the oxides of silicon, germanium and zirconium. Combinations of such oxides with each other and with other oxides are also useful provided that at least about 40 weight percent, and preferably at least 50 weight percent, of the total oxide is titania or a combination of the aforesaid Groups IIIA, IVA and/or Group IVB metal oxides. Thus, mixtures of oxides which can be used to provide the binder material herein include boria-titania, alumina-titania, gallia-titania, germania-titania, tin oxide-titania, silica-titania, titania-zirconia, and titania-hafnium oxide.

It is an essential requirement of the present method that the formable, e.g., extrudable, mass prepared in step (a) contain at least about 0.5 wt. %, usually from about 1 to about 30 wt. %, preferably from about 2 to about 15 wt. % of the aqueous slurry of hydrous titania.

The low acidity titania is added in dry particulate form, e.g., titanium oxide hydrate, so as to control the moisture content of the binder/zeolite/dispersant mixture at a level to ensure satisfactory forming, e.g., extrusion.

The composition of the formable mass of step (a) will be as follows, in weight %:

| Component | Useful | Usually | Preferably |
|---|---|---|---|
| Molecular Sieve | 10 to 90 | 25 to 85 | 40 to 80 |
| Aqueous Slurry of Hydrous Titania | at least 0.5 | 1 to 30 | 2 to 15 |
| Titanium Oxide Binder | 5 to 90 | 10 to 75 | 20 to 60 |

An extrusion aid, such as hydroxypropyl methylcellulose, may be added to the mixture of molecular sieve, e.g., zeolite, titania binder and aqueous slurry of hydrous titania, which is to be pelleted, tableted, or extruded. The extrusion aid is generally added in an amount in the range of from about 0 to about 5 wt. %.

The relative proportions of molecular sieve and low acidity refractory oxide binder on an anhydrous basis in the final catalyst can vary widely with the molecular sieve content ranging from between about 1 to about 99 weight percent, e.g., in the range of from about 5 to about 80 weight percent, of the dry composite.

Extrudates of 1/16 inch obtained in accordance with the prior art, as hereinafter exemplified, will typically have a crush strength of from less than about 20 lb/inch. Extrudates of the present invention, however, have a crush strength of from greater than about 30 lb/inch. In addition, the low acidity titania-bound extrudates of this invention (not 100% molecular sieve) are also characterized by a high hydrocarbon sorption capacity of over 9 wt. % n-hexane and 6.5 wt. % cyclohexane sorption for ZSM-5.

The catalyst products of this invention can find utility in a wide variety of processes which are both catalytic and noncatalytic. The materials can be used as absorbents. Additionally, they can be used as catalysts for a variety of organic conversions. The low acidity titanium oxide can be used as a support for a catalytic material, e.g., a hydrogenation component such as a Group VIII or VIB metal, particularly platinum, palladium, cobalt, molybdenum, iron, tungsten, nickel or mixtures of the same. The catalytic metals in the form of their oxides or salts can also be added to the low acidity refractory oxide during a mulling step with pH adjustment, if necessary, to stabilize the oxide component of the mixture. Generally, the catalytic metals are added in an amount less than about 30 wt. % and preferably less than about 10 wt. %. Noble metals are generally added in an amount less than about 1 wt. %. In addition, the low acidity refractory oxide-bound products find utility in hydrocracking, isomerization, hydrogenation, dehydrogenation, polymerization, reforming, catalytic cracking, catalytic hydrocracking, toluene disproportionation, and the like. Thus, extrudates of this invention can be used with or without added active metal components for catalytic cracking, isomerization, alkylation, reforming and hydrogenative conversions such as hydrocracking, hydrogenation and hydrofining, e.g., desulfurization and denitrogenation. Catalytic cracking conditions usually include temperatures of at least 315° C., generally from about 400° C. to about 600° C., and pressures between atmospheric and about 200 psig. Hydrogenative conversions can be accomplished at various conditions depending on the feedstock characteristics and the desired degree of conversion. Hydrogenation can be effected at pressures of from about 300 psig to about 3000 psig and at temperatures of from about 90° C. to about 540° C., usually from about 315° C. to about 485° C. Hydrogen is added at rates of at least about 500 standard cubic feet per barrel, usually from about 1000 to about 20,000 SCF/BBL.

Catalyst products of this invention are also useful for conversion of olefins to alcohols and/or ethers. The alcohols and/or ethers resulting from this conversion process may be advantageously employed, for example, as blending components for gasoline, and as co-solvents for methanol to be incorporated into gasoline. Catalyst products of the present invention are especially useful for $NO_x$ removal by selective catalytic reduction (SCR).

Representative of the zeolites which are useful as components of the present catalyst are zeolite Beta, zeolite X, zeolite L, zeolite Y, ultrastable zeolite Y (USY), dealuminized Y (Deal Y), mordenite, ZSM-3, ZSM-5, ZSM-11, ZSM-12, ZSM-20, ZSM-22, ZSM-23, ZSM-35, ZSM-50, compositions of U.S. Pat. No. 4,962,239, e.g., MCM-22 and PSH-3, MCM-49, and mixtures of any of the foregoing. As used herein, large-pore size refers to pores having an average cross-section of greater than about 6 Angstroms, and medium-pore size refers to pores having an average cross-section of from about 4 to about 6 Angstroms.

Also included within the definition of the useful molecular sieves are crystalline porous silicoaluminophosphates such as those disclosed in U.S. Pat. No. 4,440,871, the catalytic behavior of which is similar to that of the aluminosilicate zeolites.

Zeolite Beta is described in U.S. Pat. No. Re. 28,341 (of original U.S. Pat. No. 3,308,069), to which reference is made for details of this catalyst.

Zeolite X is described in U.S. Pat. No. 2,882,244, to which reference is made for the details of this catalyst.

Zeolite L is described in U.S. Pat. No. 3,216,789, to which reference is made for the details of this catalyst.

Zeolite Y is described in U.S. Pat. No. 3,130,007, to which reference is made for details of this catalyst.

Low sodium ultrastable zeolite Y (USY) is described in U.S. Pat. Nos. 3,293,192; 3,354,077; 3,375,065; 3,402,996; 3,449,070; and 3,595,611, to which reference is made for details of this catalyst.

Dealuminized zeolite Y can be prepared by the method disclosed in U.S. Pat. No. 3,442,795, to which reference is made for details of this catalyst.

Zeolite ZSM-3 is described in U.S. Pat. No. 3,415,736, to which reference is made for details of this catalyst.

Zeolite ZSM-5 is described in U.S. Pat. No. Re. 29,948 (of original U.S. Pat. No. 3,702,886), to which reference is made for details of this catalyst.

Zeolite ZSM-11 is described in U.S. Pat. No. 3,709,979, to which reference is made for the details of this catalyst.

Zeolite ZSM-12 is described in U.S. Pat. No. 3,832,449, to which reference is made for the details of this catalyst.

Zeolite ZSM-20 is described in U.S. Pat. No. 3,972,983, to which reference is made for the details of this catalyst.

Zeolite ZSM-22 is described in U.S. Pat. No. 4,556,477, to which reference is made for the details of this catalyst.

Zeolite ZSM-23 is described in U.S. Pat. No. 4,076,842, to which reference is made for the details of this catalyst.

Zeolite ZSM-35 is described in U.S. Pat. No. 4,016,245, to which reference is made for the details of this catalyst.

Zeolite ZSM-50 is described in U.S. Pat. No. 4,640,829, to which reference is made for details of this catalyst.

U.S. Pat. No. 4,962,239 to which reference is made above is incorporated herein by reference in its entirety. This patent teaches a process for preparing ethers over catalyst comprising a particular class of zeolites, e.g., MCM-22 and PSH-3.

MCM-36 is described in U.S. Ser. No. 07/811,360, filed Dec. 20, 1991, and is incorporated herein by reference in its entirety.

MCM-41 is described in U.S. Pat. No. 5,098,684, to which reference is made for the details of this catalyst.

MCM-49 is described in U.S. Pat. No. 5,236,575, and is incorporated herein by reference in its entirety.

The original cations associated with each of the molecular sieves utilized herein can be replaced by a wide variety of other cations employing techniques well known in the art. Typical replacing cations including hydrogen and hydrogen precursors, e.g., ammonium and alkyl ammonium, and metal cations. Suitable metal cations include metals such as rare earth metals, as well as metals of Groups IIA, IIIA, IVA, IB, IIB, IIIB, IVB, VIB and VIII of the Periodic Table, e.g., platinum and palladium.

Typical ion-exchange techniques call for contacting the selected molecular sieve, e.g., zeolite, with a salt of the desired replacing cation. Although a wide variety of salts can be employed, particular preference is given to chloride, nitrates and sulfates. Representative ion-exchange techniques are disclosed in a wide variety of patents including U.S. Pat. Nos. 3,140,249; 3,140,251; and 3,140,253.

Following contact with a solution of the desired replacing cation, the molecular sieve is then preferably washed with water and dried at a temperature ranging from about 65° C. to about 315° C. and thereafter calcined in air, or other inert gas, at temperatures ranging from about 260° C. to about 815° C. for periods of time ranging from about 1 to about 48 hours or more. Catalysts of improved selectivity and other beneficial properties can be obtained by subjecting the molecular sieve to treatment with steam at elevated temperatures ranging from about 260° C. to about 650° C., and preferably from about 400° C. to about 540° C. The treatment can be accomplished in an atmosphere of 100% steam or in an atmosphere consisting of steam or ammonia and some other gas which is essentially inert to the molecular sieves. A similar treatment can be accomplished at lower temperatures and elevated pressure, e.g., from about 175° C. to about 375° C. at from about 10 to about 200 atmospheres.

If so desired, the catalyst can be treated with reagents prior to steaming and with organics still contained to remove alumina from the outside surface, or calcined in air or inert atmosphere to remove the organics and then ion exchanged to the ammonium form or other desired metal exchanged form. It is a special attribute herein that it has sufficient integrity to withstand treatment with acids so that it is possible to extrude an aluminosilicate zeolite such as zeolite Y and steam, acid extract, calcine or effect combinations thereof to produce a stable high silica-to-alumina Y in an easily handled form. Processes for dealuminizing Y are well known in the art, i.e., see Rabo, *Zeolite Chemistry and Catalysis*, ACS Monograph 171, chapter 4 (1976), the entire disclosure being incorporated by reference herein.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=$0.016$ sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLES

The specific examples herein presented demonstrate the present invention (Examples 7, 11, 12 and 15) and provide comparisons with other catalyst preparation methods involving low acidity titania binders. Examples 1 and 8 employ a catalyst preparation method in the absence of a binding agent. Examples 2, 3, 9, 10 and 14 utilize ammonium zirconium carbonate (AZC) as the binding agent. Example 4 utilizes TiOCl$_2$ as the binding agent. Example 5 utilizes titanium isopropoxide as the binding agent. Example 13 utilizes NaOH as the binding agent. Example 6 uses colloidal silica as the binding agent.

Example 1

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and no binding agent was used. A physical mixture of 65 parts by weight ZSM-5 and 35 parts by weight titania powder was mulled to form a uniform mixture. A sufficient amount of deionized water was added to form an extrudable mixture with a solids content in the range of about 50–65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

Example 2

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 33 parts by weight titania powder and 2 parts by weight AZC was mulled to form a uniform mixture. All components were blended based on parts by weight on a 100% solids basis. An additional 2 wt. % Methocel (hydroxypropyl cellulose) was used as an extrusion aid. A sufficient amount of deionized water was added to form an extrudable mixture with a solids content in the range of about 50–65 wt %. The mixture was then extruded. However, the extrusion failed since the muller mix formed a gummy material inside the extruder which plugged the die plate. The composition of the titania-bound ZSM-5 catalyst is set forth in Table 1.

Example 3

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 29 parts by weight titania powder and 6 parts by weight AZC was mulled to form a uniform mixture. All components were blended based on parts by weight on a 100% solids basis. An additional 2 wt. % Methocel was used as an extrusion aid. A sufficient amount of deionized water was added to form an extrudable mixture with a solids content in the range of about 50–65 wt %. The mixture was then extruded. However, the extrusion failed since the muller mix formed a gummy material inside the extruder which plugged the die plate. The composition of the titania-bound ZSM-5 catalyst is set forth in Table 1.

Example 4

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and TiOCl$_2$ sold by Kemira was used as the binding agent. A physical mixture of 65 parts by weight ZSM-5, 28 parts by weight titania powder and 7 parts by weight TiOCl$_2$ was mulled to form a uniform mixture. A sufficient amount of deionized water was added to form an extrudable mixture with a solids content in the range of about 50–65 wt %. The mixture was then extruded; however, the extrusion failed. The muller mix formed a gummy material which plugged both the auger and the die plate. The composition of the titania-bound ZSM-5 catalyst is set forth in Table 1.

Example 5

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and titanium isopropoxide sold by Alfa was used as the binding agent. A physical mixture of 65 parts by weight ZSM-5, 27 parts by weight titania powder and 8 parts by weight titanium isopropoxide was mulled to form a uniform mixture. A sufficient amount of deionized water was added to form an extrudable mixture with a solids content in the range of about 50–65 wt %. However, the mulling failed. The titanium isopropoxide reacted vigorously upon contacting with moisture and formed titania solid, which could not be mixed homogeneously. The composition of the titania-bound ZSM-5 catalyst is set forth in Table 1.

Example 6

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and colloidal silica was used as the binding agent. A physical mixture of 65 parts by weight ZSM-5, 27 parts by weight titania powder and 8 parts by weight colloidal silica was mulled to form a uniform mixture. A sufficient amount of deionized water was added to form an extrudable mixture with a solids content in the range of about 50–65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

Example 7

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 27 parts by weight titania powder and 8 parts by weight aqueous slurry of titanium oxide hydrate was mulled to form a uniform mixture. All components were blended based on parts by weight on a 100% solids basis. An additional 2 wt. % Methocel was used as an extrusion aid. A sufficient amount of deionized water was added to form an extrudable mixture with a solids content in the range of about 50–65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

TABLE 1

| Example | 1 | 2 | 3 | 4 | 5 | 6 | 7 |
| --- | --- | --- | --- | --- | --- | --- | --- |
| Wt. % TiO$_2$ binder | 35 | 33 | 29 | 28 | 27 | 27 | 27 |
| TiO$_2$ powder source | Titania | Titania | Titania | Titania | Titania | Titania | Titania |
| Wt. % binding agent | 0 | 2 | 6 | 7 | 8 | 8 | 8 |
| Binding agent type | — | AZC | AZC | TiOCl$_2$ | Titanium isopropoxide | Colloidal silica | Aqueous slurry of titanium oxide hydrate |
| Wt. % extrusion aid | 0 | 2 | 2 | 0 | 0 | 0 | 2 |
| Extrusion aid type | — | Methocel | Methocel | — | — | — | Methocel |
| Extrusion | OK | Failed | Failed | Failed | Failed | Good | Good |
| Crush strength, lb/in | 13 | NA | NA | NA | NA | 39 | 65 |
| Alpha activity | 319 | NA | NA | NA | NA | 222 | 389 |
| Na content, ppm | 105 | NA | NA | NA | NA | 890 | 49 |
| Sulfur content, wt. % | 0.015 | NA | NA | NA | NA | ≈0.1 | ≈0.1 |
| Surface area, m$^2$/g | 285 | NA | NA | NA | NA | 304 | 284 |
| Sorption capacity, wt. % | | | | | | | |
| Cyclohexane | 8.3 | NA | NA | NA | NA | 8.1 | 8.6 |

TABLE 1-continued

| Example | 1 | 2 | 3 | 4 | 5 | 6 | 7 |
|---|---|---|---|---|---|---|---|
| n-Hexane | 10.1 | NA | NA | NA | NA | 10.5 | 9.7 |

The physical properties of the titania-bound ZSM-5 catalysts of Examples 1 to 7 are shown in Table 1. The muller mix without any binding agent was extrudable, but the extrusion was difficult and the extrudates produced a catalyst with a poor crush strength of 13 lb/in (Example 1). Extrusions using AZC and TiOCl$_2$ failed since the muller mix formed gummy materials inside the extruder which plugged the die plate (Examples 2, 3 and 4). The extrusion using titanium isopropoxide also failed since it vigorously formed a titania gel upon contacting with moisture (Example 5). The extrusion using colloidal silica resulted in a catalyst with a crush strength of 39 lb/in (Example 6). The extrusion using an aqueous slurry of titanium oxide hydrate results in an improved catalyst with a crush strength of 65 lb/in (Example 7).

Example 8

An organic-free ZSM-5 was ammonium exchanged with 5 cc of NH$_4$NO$_3$ solution (1M) per gram of zeolite for 2 hours then dried in an oven at 120° C. Titanium oxide hydrate sold by Kemira was used as the titania source and no binding agent was used. A physical mixture of 65 parts by weight ZSM-5 and 35 parts by weight titania powder was mulled to form a uniform mixture. A sufficient amount of deionized water was added to form an extrudable mixture with a solids content in the range of about 50-65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

Example 9

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 31 parts by weight titania powder and 4 parts by weight AZC was mulled to form a uniform mixture. A sufficient amount of deionized water was added to form an extrudable mixture with a solids content in the range of about 50-65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The titania-bound ZSM-5 catalyst had the properties as set forth in Table 2.

Example 10

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 27 parts by weight titania powder and 8 parts by weight AZC was mulled to form a uniform mixture. A sufficient amount of deionized water was added to form an extrudable mixture with a solids content in the range of about 50-65 wt %. The mixture was then extruded. However, the extrusion failed. The muller mix formed a gummy material inside the extruder which plugged the die plate. The composition of the titania-bound ZSM-5 catalyst is set forth in Table 2.

Example 11

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 31 parts by weight titania powder and 4 parts by weight aqueous slurry of titanium oxide hydrate was mulled to form a uniform mixture. A sufficient amount of deionized water was added to form an extrudable mixture with a solids content in the range of about 50-65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

Example 12

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 27 parts by weight titania powder and 8 parts by weight aqueous slurry of titanium oxide hydrate was mulled to form a uniform mixture. A sufficient amount of deionized water was added to form an extrudable mixture with a solids content in the range of about 50-65 wt %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

Example 13

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and a 50 wt % NaOH solution was used as the binding agent. A physical mixture of 65 parts by weight ZSM-5 and 35 parts by weight titania powder was mulled to form a uniform mixture. All components were blended based on parts by weight on a 100% solids basis. An additional 3 wt. % NaOH was added and mulled. A sufficient amount of deionized water was added to form an extrudable mixture with a solids content in the range of about 50–65 wt %. The mixture was extruded to produce 1/16″ cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

Example 15

A tetraethyl ammonium-containing zeolite Beta was ammonium exchanged with 5 cc of $NH_4NO_3$ solution (1M) per gram of zeolite for 2 hours and then dried in an oven at 120° C. Titanium oxide hydrate sold by Kemira was used as the titania source and an aqueous slurry of

TABLE 2

| Example | 8 | 9 | 10 | 11 | 12 | 13 |
|---|---|---|---|---|---|---|
| Wt.% $TiO_2$ binder | 35 | 31 | 27 | 31 | 27 | 35 |
| $TiO_2$ powder source | Titania | Titania | Titania | Titania | Titania | Titania |
| Wt. % binding agent | 0 | 4 | 8 | 4 | 8 | 3 |
| Binding agent type | — | AZC | AZC | Aqueous slurry of titanium oxide hydrate | Aqueous slurry of titanium oxide hydrate | NAOH |
| Extrusion | OK | Good | Failed | Good | Good | Good |
| Crush strength, lb/in | 16 | 44 | NA | 38 | 53 | 31 |
| Alpha activity | 775 | 800 | NA | 785 | 782 | * |
| Na content, ppm | 70 | 230 | NA | 67 | 93 | 16,000 |
| Sulfur content, wt. % | 0.05 | 0.05 | NA | 0.05 | 0.15 | ≃0.1 |
| Surface area, $m^2/g$ | 261 | 322 | NA | 262 | 260 | 225 |
| Sorption capacity, wt. % | | | | | | |
| Cyclohexane | 7.0 | 9.1 | NA | 9.3 | 6.9 | 7.0 |
| n-Hexane | 9.0 | 11.0 | NA | 9.4 | 9.0 | 9.1 |

*(Too much Na present to calculate Alpha Activity without requirement of additional steps. The Alpha Activity is expected to be well below about 700.)

The physical properties of the titania-bound ZSM-5 of Examples 8 to 13 are shown in Table 2. The muller mix without any binding agent was extrudable, but the extrusion was difficult and the extrudates produced a catalyst with a poor crush strength of 16 lb/in (Example 8). The extrusion using 4 wt % AZC produced a catalyst with a 44 lb/in crush strength (Example 9). However, the extrusion using 8 wt % AZC failed since the muller mix formed gummy materials inside the extruder which plugged the die plate (Example 10). The extrusions using an aqueous slurry of titanium oxide hydrate result in crush strengths of 38 and 53 lb/in (Examples 11 and 12). As the content of the aqueous slurry of titanium oxide hydrate increases, the finished catalyst has increased crush strength. The extrusion using NaOH resulted in a catalyst with 31 lb/in crush strength (Example 13). However, the integrity of the extrudates was diminished during an ammonium exchange to remove the excess sodium used for the binding.

Example 14

A tetraethyl ammonium-containing zeolite Beta was ammonium exchanged with 5 cc of $NH_4NO_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight zeolite Beta, 31 parts by weight titania powder and 4 parts by weight AZC was mulled to form a uniform mixture. A sufficient amount of deionized water was added to form an extrudable mixture with a solids content in the range of about 50–65 wt %. The mixture was extruded to produce 1/16″ cylindrical shape extrudates and dried in an oven at 120° C. The extrudates were then calcined in nitrogen at 480° C. for 3 hours followed by calcination in air at 538° C. for 6 hours. The composition and physical properties of the titania-bound zeolite beta catalyst are set forth in Table 3.

titanium oxide hydrate was used as the binding agent. A physical mixture of 65 parts by weight zeolite Beta, 27 parts by weight titania powder and 8 parts by weight aqueous slurry of titanium oxide hydrate was mulled to form a uniform mixture. A sufficient amount of deionized water was added to form an extrudable mixture with a solids content in the range of about 50–65 wt %. The mixture was extruded to produce 1/16″ cylindrical shape extrudates and dried in an oven at 120° C. The extrudates were then calcined in nitrogen at 480° C. for 3 hours followed by calcination in air at 538° C. for 6 hours. The composition and physical properties of the titania-bound zeolite beta catalyst are set forth in Table 3.

TABLE 3

| Example | 14 | 15 |
|---|---|---|
| Wt. % $TiO_2$ binder | 31 | 27 |
| $TiO_2$ powder source | Titania | Titania |
| Wt. % binding agent | 4 | 8 |
| Binding agent type | AZC | Aqueous slurry of titanium oxide hydrate |
| Extrusion | Poor | Good |
| Crush strength, lb/in | 23 | 28 |
| Alpha activity | 382 | 474 |
| Na content, ppm | ≃200 | 72 |
| Sulfur content, wt. % | ≃0.1 | 0.015 |
| Surface area, $m^2/g$ | 473 | 442 |
| Sorption capacity, wt. % | | |
| Cyclohexane | 14.5 | 13.0 |
| n-Hexane | 19.5 | 16.1 |

Table 3 shows improved crush strength of the titania-bound zeolite Beta catalyst using an aqueous slurry of hydrous titania. The extrusion using AZC as the binder material resulted in a catalyst crush strength of 23 lb/in (Example 14) while the extrusion using an aqueous slurry of titanium oxide hydrate resulted in a catalyst with an improved crush strength of 28 lb/in (Example 15).

As shown from the above examples, the titania-binding method of the present invention is more effective in preparing titania-bound zeolite-containing catalysts than caustic addition or addition of hydroxy and/or alkoxy bridged metallo polymers. The use of an aqueous slurry of hydrous titania does not require additional ammonium exchanges after the binding which is required when NaOH is used as the binding agent. In addition titania extrusions using an aqueous slurry of hydrous titania do not promote the formation of a gummy material which plugs up the die plate during an extrusion. Catalysts produced by the process of the present invention are particularly useful for conversion of $NO_x$.

Changes and modifications in the specifically described embodiments can be carried out without departing from the scope of the present invention which is intended to be limited only by the scope of the appended claims.

What is claimed is:

1. A method for preparing a titania-bound molecular sieve composition which comprises:
   (a) providing a substantially homogenous mixture of molecular sieve material, a low acidity titanium oxide, titanium oxide hydrate and sufficient water to provide an extrudable mass;
   (b) extruding the extrudable mass resulting from step (a); and
   (c) calcining the extrudate resulting from step (b).

2. The method of claim 1 wherein a hydroxypropyl methylcellulose extrusion aid is added to said mixture.

3. The method of claim 1 wherein said substantially homogenous mixture further comprises a refractory oxide selected from the group consisting of silica, germania, zirconia, or a combination thereof.

4. The method of claim 1 wherein the molecular sieve component is a medium-pore zeolite.

5. The method of claim 1 wherein the molecular sieve component is selected from the group consisting of those having the structure of ZSM-5, ZSM-11, ZSM-12, ZSM-22, ZSM-23, ZSM-35, ZSM-50, MCM-22, PSH-3, and MCM-49.

6. The method of claim 5 wherein the molecular sieve component has the structure of ZSM-5.

7. The method of claim 1 wherein the molecular sieve component is a large-pore zeolite.

8. The method of claim 1 wherein the molecular sieve component is selected from the group consisting of those having the structure of zeolite Y, zeolite L, zeolite Beta, ZSM-4, ZSM-20, and mordenite.

9. The method of claim 8 wherein the molecular sieve component has the structure of zeolite Beta.

10. The method of claim 1 wherein the molecular sieve component is selected form the group consisting of those having the structure of VPI-5, SAPO-11, SAPO-17, SAPO-34, SAPO-37, MCM-36, and MCM-41.

11. The method of claim 1 wherein said titanium oxide hydrate is in an amount in the range of from about 0.5 to about 30 wt. % in the extrudable mass.

12. The method of claim 1 wherein said titanium oxide hydrate is in an amount in the range of from about 2 to about 15 wt. % in the extrudable mass.

13. The method of claim 1 wherein the extrudate of step (b) is dried prior to step (c).

14. The method of claim 1 wherein step (b) is conducted in a screw extruder.

15. The method of claim 1 which further comprises treating the product of step (c) by ion-exchange or by steaming or by acid treating or by a combination thereof.

16. The method of claim 1 wherein said substantially homogenous mixture further comprises a hydrogenation component and wherein said hydrogenation component is selected from the group consisting of platinum, palladium, cobalt, molybdenum, iron, tungsten, nickel, and mixtures thereof.

17. The method of claim 1 wherein said molecular sieve has a cation or a mixture of cations selected from the group consisting of hydrogen and hydrogen precursors, rate earth metals, and metals of Groups IIA, IIIA, IVA, IB, IIB, IIIB, IVB, VIB, and VIII of the Periodic Table of the Elements.

18. The low acidity titania-bound molecular sieve composition resulting from the method of claim 1.

* * * * *